(12) United States Patent
Mahr

(10) Patent No.: US 6,624,098 B1
(45) Date of Patent: Sep. 23, 2003

(54) SAILCLOTH HAVING IMPROVED STABILITY

(75) Inventor: Peter Mahr, Weston, CT (US)

(73) Assignee: North Marine Group, Milford, CT (US)

( * ) Notice: Subject to any disclaimer, the term of this patent is extended or adjusted under 35 U.S.C. 154(b) by 236 days.

(21) Appl. No.: 09/690,498

(22) Filed: Oct. 17, 2000

(51) Int. Cl.$^7$ .............. D03D 15/00; B32B 5/26; B32B 27/12; B63H 9/06
(52) U.S. Cl. ............ 442/208; 442/203; 442/239; 442/243; 442/261; 442/286; 114/102.31; 114/102.29
(58) Field of Search ............... 442/239, 236, 442/243, 286, 261, 203, 208; 114/102.31, 102.29; 244/142

(56) References Cited

U.S. PATENT DOCUMENTS

| | | | | | |
|---|---|---|---|---|---|
| 3,903,826 | A | * | 9/1975 | Andersen | 114/102.31 |
| 4,679,519 | A | * | 7/1987 | Linville | 114/102.31 |
| 5,161,479 | A | * | 11/1992 | Mahr | 114/102.31 |
| 5,304,414 | A | * | 4/1994 | Bainbridge et al. | 442/208 |
| 6,074,722 | A | * | 6/2000 | Cuccias | 428/107 |

* cited by examiner

Primary Examiner—Terrel Morris
Assistant Examiner—Jennifer Boyd
(74) Attorney, Agent, or Firm—Pyle & Piontek

(57) ABSTRACT

A sailcloth is constructed by laminating two layers of cloth together with a central layer of film. The cloth layers are oriented such that stretch resistant yarns in the layers run perpendicular to each other.

8 Claims, 4 Drawing Sheets

SAILCLOTH HAVING IMPROVED STABILITY

BACKGROUND OF THE INVENTION

This invention relates to sailcloth and more particularly to composite materials which are highly durable and may be used, for example, to make very large sails.

Many sails in use today are made from tightly woven continuous filament yarns. Conventional sails are made from flat sheets of tightly woven polyester fabrics. The sheets are cut into panels, and the panels are sewn together using a process called broadseaming to obtain an approximate three dimensional shape. Cloth and film laminates are also employed to improve stretch resistance and some sails are also reinforced with individual strands.

More recently, improved polymers have been developed, which, when formed into yarns, have very high stretch resistance. These include aramids, sold under the trademark "Kevlar", highly oriented, high molecular weight polyethylene, sold under the trademark "Spectra", and specialized polyesters, sold under the trademark "Pentex," as well as others known in the art of sailmaking.

In the weaving process, the yarns pass over and under each other in a repeating pattern, which induces a certain amount of crimp in the yarn. Woven sailcloth cannot be made entirely from aramid yarns because the crimp reduces the desired stretch properties of the fabric and friction between yarns causes early failure. Thus, aramid and other cloths comprising low stretch yarns are made from low stretch yarns running in one direction and polyester yarns running in the other direction. Thus, the fabric is relatively weak in one direction, and the sailmaker designs sails in which the panels are arranged such that the strong yarns run in the direction of maximum load lines in the sail.

It is also known in the weaving industry that yarn crimp can be controlled in various ways. For example if fewer or lighter weight yarns are used in the fill direction than in the warp direction, the warp yarns will be relatively straight and uncrimped, and the cloth will have low stretch in the warp direction, but will have stretch in the fill direction.

While film and fabric laminates have greatly improved the low stretch properties of sails, there is a continuing need for improvements for woven sailcloth having high strength and low stretch in both the warp and fill directions.

SUMMARY OF THE INVENTION

The composite sailcloth of the present invention comprises at least three layers laminated together. One outer layer is a woven cloth in which high strength and low stretch yarns are oriented in the fill direction and relatively free of crimp. A central layer comprises a polymer film, preferably polyester. The third layer is a woven cloth in which the high strength and low stretch yarns are oriented in the warp direction. The assembly is laminated by applying a curable adhesive between both sides of the film and the woven layers.

The film layer may comprise a single sheet of film or a pair of films laminated together with reinforcing yarns extending at angles to the warp and fill directions of the woven cloth.

An additional warp oriented fabric may be laminated to the fill oriented layer using an additional layer of film, depending on factors such as desired basis weight and how the fabric will be used in the sail. Typical basis weights for fabrics of this nature will be in the order of five to twenty five ounces per square yard.

THE DRAWINGS

DETAILED DESCRIPTION

Figure 1:
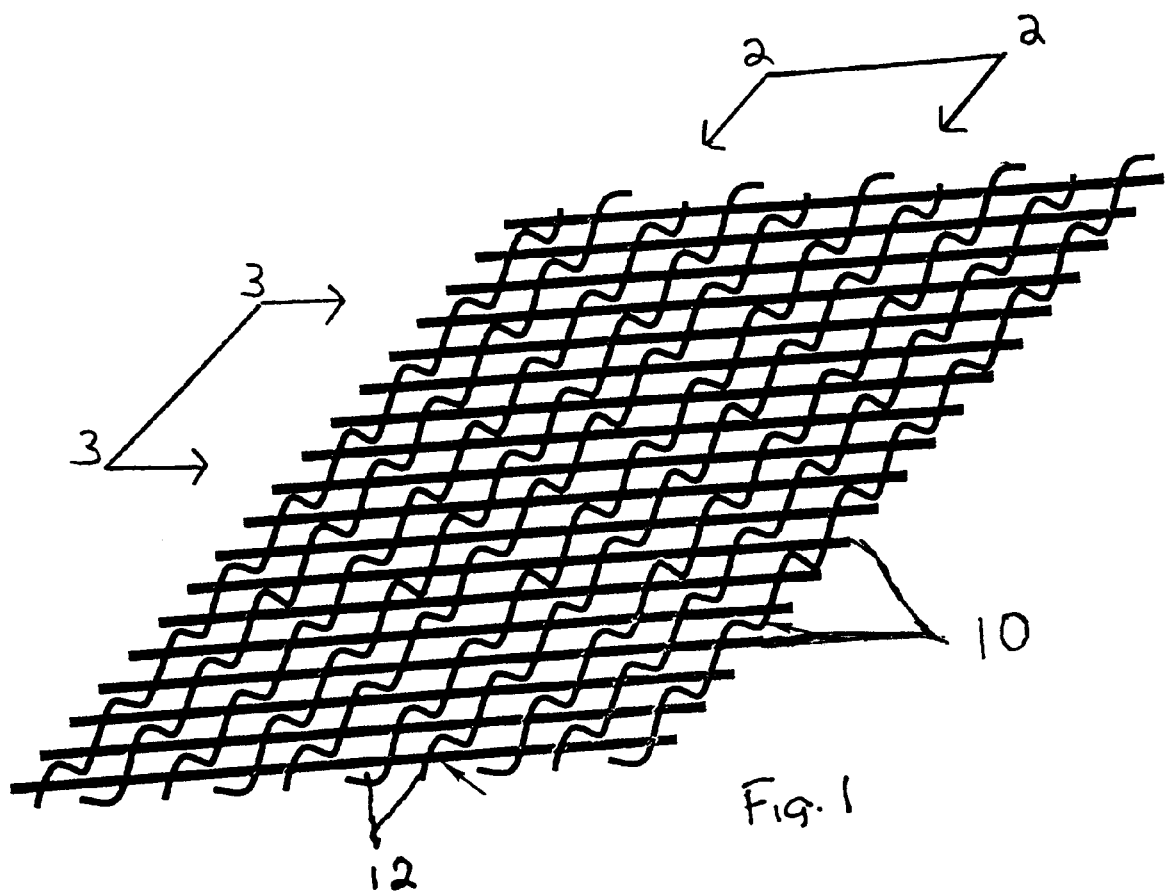
FIG. 1 is a schematic view of a woven fabric in which the yarns extending in one direction are highly oriented and straight, with the crossing yarns being highly crimped.
Figure 2:
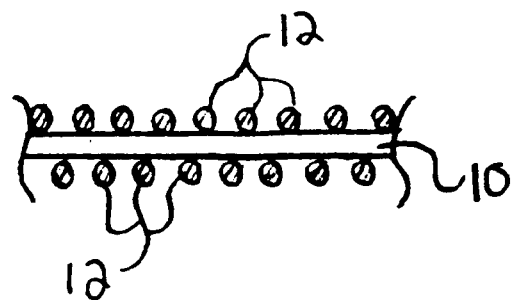
FIG. 2 is a cross sectional view of the woven fabric of FIG. 1 taken along the line 2—2 of FIG. 1.
Figure 3:
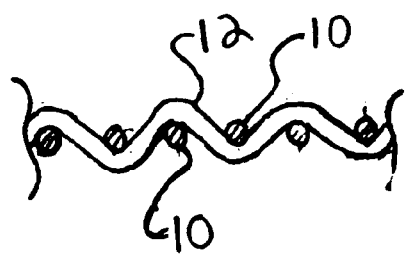
FIG. 3 is a cross sectional view of the woven fabric of FIG. 1 taken along the line 3—3 of FIG. 1.

FIGS. 1 to 3 show a schematic of a plain weave woven fabric in which yarns 10 extending in one direction are straight and relatively uncrimped and perpendicular yarns 12 pass over and under the yarns in a serpentine path and are highly crimped. In a weaving process, the conditions and set-up can be modified such that the straight yarns are either the fill or the warp yarns. It will be understood that the warp yarns extend in the machine direction of the weaving process, and the fill yarns extend in the cross machine direction.

As used herein, the phrase "yarns oriented in the warp direction or fill direction" shall mean yarns in a woven cloth which are substantially straight and uncrimped in the stated direction such that when a tensile force is applied in the stated direction, any stretch in the cloth due to crimp will be less than five percent, preferably less than three percent and most preferably less than 1.5 percent.

The straight yarns 10 are selected from low stretch, high strength, such as Kevlar, Spectra or Pentex or any other yarns known in the art. The relatively crimped yarns 12 may be polyester or another polymer, and these yarns are generally either more flexible, lighter in weight, or spaced less closely than the yarns 10. These types fabrics are commercially available and are generally referred to as warp or fill oriented fabrics.

Figure 4:
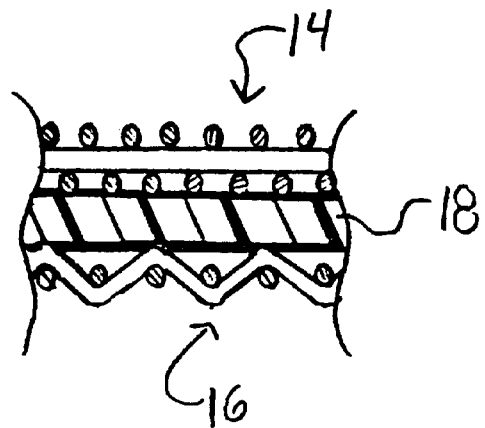
FIG. 4 is a cross sectional view of a first embodiment of the sailcloth of the present invention.

FIG. 4 shows a laminate comprising a pair of outer woven cloth layers 14 and 16. A central film 18, preferably polyester film, is located between the outer layers. The laminate is held together by a flexible curable adhesive (not shown), applied between both sides of the film 18 and the inner surfaces of the woven layers. Heat and pressure can be applied to cure the adhesive.

As shown, one of the outer woven layers, such as 14 comprises the low stretch yarn oriented in the warp direction. The other cloth 16 has the low stretch yarns oriented in the fill direction. As a result, the laminate will have low stretch properties in both the warp and fill directions, with the low stretch yarns in the layers running perpendicular to each other. This should be contrasted with conventional sailcloth in which low stretch can achieved in only one direction of the weave by means of yarn orientation.

The polyester film 18, sold under the trademark "Mylar" is stretch resistant in all directions, and serves to provide additional stability to the laminate, especially in the bias directions, or in directions at angles to the oriented yarns.

Figure 5:
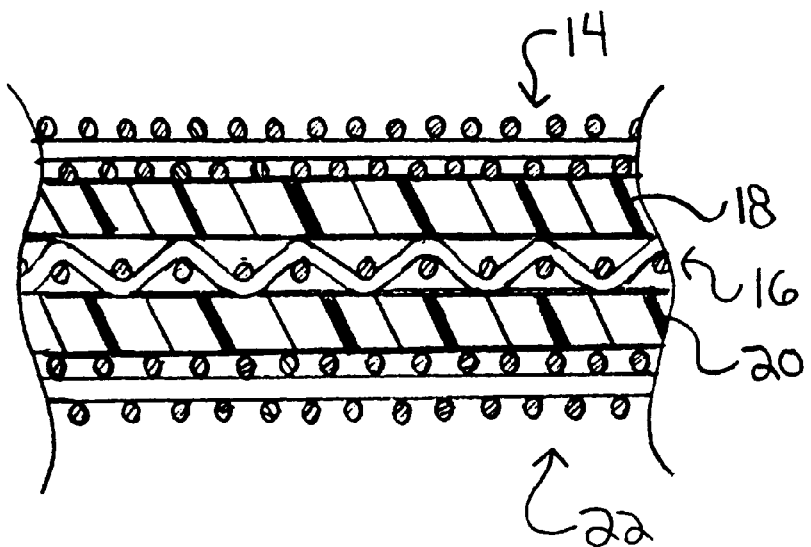
FIG. 5 is a cross sectional view of a second embodiment of the sailcloth of the present invention.

FIG. 5 shows another version having the same structure as shown in FIG. 2, except that a second film 20 and a second warp oriented cloth 22 is laminated to the fill oriented layer 16. This structure provides additional strength in the warp direction.

Figure 6:
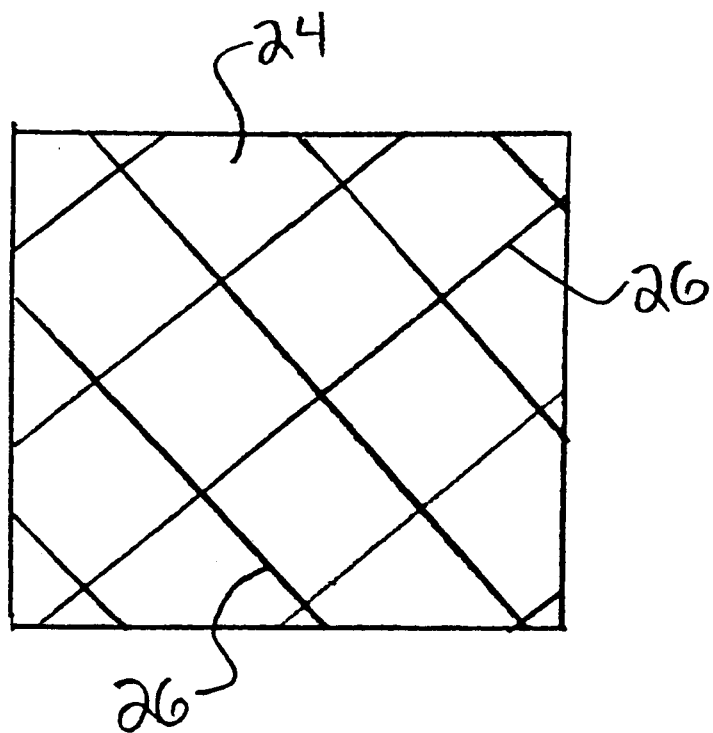
FIG. 6 is a plan view of a modification to the film layer illustrated in FIGS. 4 and 5.
Figure 7:
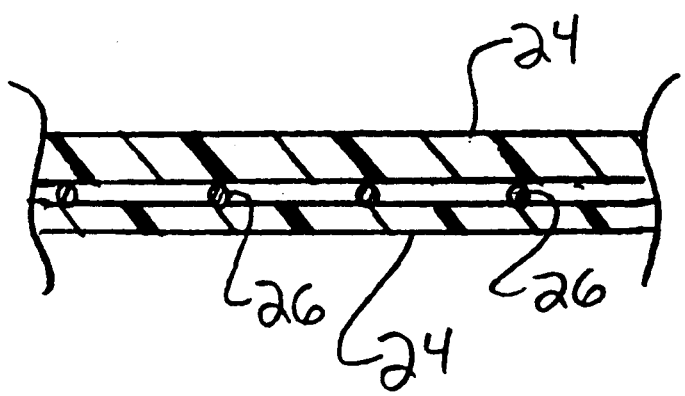
FIG. 7 is a cross sectional view of the modified film layer.

FIGS. 6 and 7 show a modified version of the film layer 18. In this version, two layers of film 24 are employed, and are laminated together by adhesive. Additional individual reinforcing yarns 26 are laminated between the two film layers. Preferably, the reinforcing yarns run at angles to the directions of the yarns in the woven cloth layers and are composed of high strength, low stretch materials. In some cases, scrims can be employed instead of yarns. Additional details on yarn reinforcement may be found in U.S. Pat. No. 5,001,003, incorporated herein by reference.

The sail fabric of the present invention is particularly suitable for making large sails, for example, large mainsails, which may be subjected to very high air pressures.

Since the sail fabric of the present invention has low stretch characteristics in two directions, it is more versatile than conventional fabrics. In making a sail, a roll of cloth is cut into panels based on desired features and implementation of the design, usually by use of a computer program. Many sails are designed such that the low stretch yarns in the panels are in general alignment with the known lines of maximum stress under sailing conditions, thus limiting possible panel arrangements.

The sailcloth of the invention is preferably made by laminating the layers together in a stepwise fashion. Typically, this is accomplished by dissolving a heat curable adhesive into a solvent, applying a layer of dissolved solvent to one side of the film, evaporating the solvent to provide an uncured layer of adhesive on the film, joining the film and fabric, and passing the laminate through a pair of heated rolls.

What is claimed is:

1. A sailcloth comprising first and second woven cloths each comprising warp and fill yarns, a film laminated between said first and second woven cloths, said first woven cloth comprising yarns in the warp direction which are stronger than yarns in the fill direction, said second woven cloth comprising yarns in the fill direction which are stronger than yarns in the warp direction.

2. A sailcloth as in claim 1, wherein the first woven cloth has aligned yarns oriented in the warp direction, and said second woven cloth has aligned yarns oriented in the fill direction, the oriented yarns in the first woven cloth and the second woven cloth being perpendicular.

3. The sailcloth of claim 1, wherein one of the yarns in the first woven cloth and one of the yarns in the second woven cloths have lower stretch characteristics than the other yarns in the first and second cloths.

4. The sailcloth of claim 1, wherein one of the yarns in each of the first and second woven cloths comprises continuous filament yarns of high molecular weight polyethylene.

5. The sailcloth of claim 1, wherein one of the yarns in each of the first and second woven cloths comprise round yarns.

6. The sailcloth of claim 1, comprising a second film layer laminated to said second woven cloth, and a third woven cloth laminated to the second film.

7. The sailcloth of claim 1, wherein said film layer comprises a pair of films laminated together, and individual reinforcing yarns between said laminated films.

8. The sailcloth of claim 7 wherein at least some of said individual reinforcing yarns extend at angles to the yarns in the woven cloth layers.

* * * * *